Figure 3:
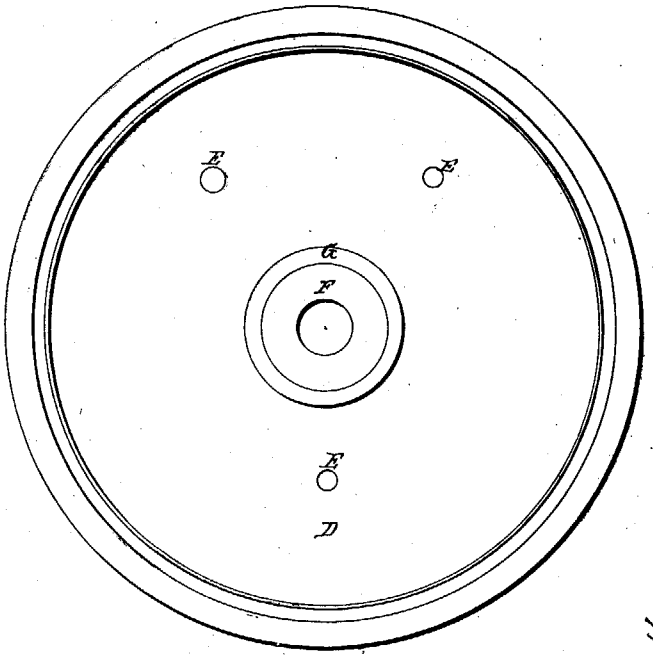
Figure 2:
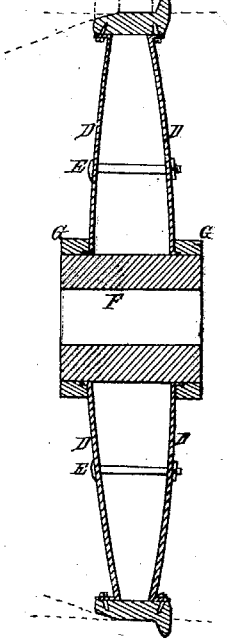
Figure 1:
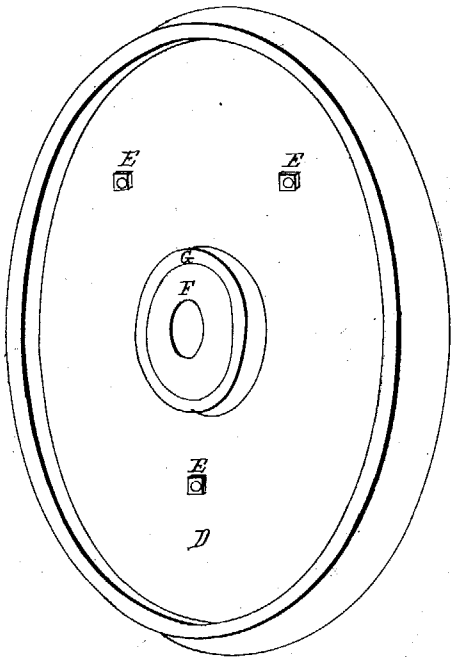

7801X

J. Elgar.

Car Wheel.

Patented Nov. 19, 1833.

(Extended for seven years from 19 November 1847.)

Nov. 19. 1833 375

7801X John Elgar.

The schedule referred to in these Letters Patent and making part of
the same containing a description in the words of the said John Elgar
himself of his improvement in the wheels of Rail Road Carriages. ——

To all whom it may concern,

Be it known, that I John Elgar, Civil Engineer, of the City of Philadel-
-phia, have invented certain improvements in the wheels of Rail Road car-
-riages, by one of which improvements they are made to adapt themselves more
readily to curved roads than such as have heretofore been used for that
purpose, and by the other a construction is given to them which will render
them more firm and durable than those now in general use, and I do hereby
declare that the following is a full and exact description of my said im-
provements. ——— The self adjusting conical wheel for running upon
curved roads is well known to Engineers, it having been made the subject
of a patent by James Wright, and a modified form of it being now used
on the Baltimore and Ohio Rail Road. The plan which I have devised
is a new modification of this principle, by which some of the inconven-
-iences which have hitherto attended its employment are in a great degree
if not altogether obviated. ——— Instead of making the wheel conical
on its whole tread, like Wright's, or of forming the conical part against
the flanch, and leaving the other part cylindrical, as in those used on
the Baltimore Road, I form the cone on the outer part of the tread of the wh-
-eel, oppos[illegible] to the flanch, leaving that part of the tread which extends —
from the flanch towards the opposite side cylindrical, or nearly so, for
one half of its width, more or less, and then tapering outward in such degree
as may be found most convenient, according to the curvature of that part
of the road which has the smallest radius. ——— The curved part of the
road is adapted to these wheels by widening the track in proportion to
the radius of curvature, so as to admit the conical part to roll on the [illegible]

376 7801X

-terior rail) whilst the cylindrical part bears upon the exterior rail.
This construction obviates the objection arising from the wrong tendency
of the cone when running on the [illegible] rail and adapts the wheel more
perfectly to those parts of [illegible] are straight, and produces other
advantages which will readily occur to experienced engineers. ——
—— In order to render rail road wheels more firm and durable than those
now in use, I form that part of the wheel usually occupied by the spokes,
of two plates of iron, preferring for this purpose thick sheet iron of three
eighths of an inch, more or less, in thickness. These sheets of iron are
raised so as to be concave, or dishing, forming the segment of a large
sphere, or if preferred, they may be made conical. These plates have a
hole in their centres to receive the hub, or nave, and have a flanch turned
up, over which the hoop of the hub may pass; or the hub may be secured
in other ways if preferred. If the rim, or tire, is of wrought iron, the plates
may have a flanch turned at their peripheries, thro' which they may be rivetted on
the interior of the rim. When the rim is of cast iron, the plates may be secured with-
out a flanch, one being cast within the rim, against which the plates may fit on ei-
ther side, rivets, or bolts passing thro' them and thro' the flanch to secure them in their
places. Other modes of fixing the plates in their places may be devised, and I do
not mean to confine myself to any specific plan of effecting this object, the manner
of doing so, not in any way affecting the principle upon which my improvement
is founded. —— What I claim as my invention in my first described im-
provement is making the wheel of a railway carriage conical on its outer edge
and cylindrical between said conical part and the flanch, for the purpose of ada-
pting it to run on curved roads, and applying it thereto upon the principles
and in the manner hereinbefore set forth. —— What I claim as my inven-
tion in my second described improvement, is the substituting of metallic plates
(generally of wrought iron) for the spokes usually employed, and giving to such
plates a form which shall be convex, either curved or conical, from the rim
to the hub of the wheel.

John Elgar

Exd. Witnesses
Robert Clarke
Wm. Wallis (Dr in [illegible])

Patented November 19, 1833 (overword)

Extended Apr 19th 1847 [illegible] [illegible] [illegible] [illegible] [illegible] [illegible] [illegible]